(12) United States Patent
Jochem

(10) Patent No.: US 6,797,854 B1
(45) Date of Patent: **\*Sep. 28, 2004**

(54) PROCESS FOR DRYING A GASEOUS OR LIQUID MIXTURE WITH THE AID OF AN ADSORBER COMPOSED OF ALUMINA AND OF A MOLECULAR SIEVE

(75) Inventor: Gérard Jochem, Le Mesnil le Roi (FR)

(73) Assignee: Rhone-Poulenc Chimie, Courbevoie Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 165 days.

(21) Appl. No.: 08/499,442

(22) Filed: Jul. 6, 1995

(30) Foreign Application Priority Data

Jul. 6, 1994 (FR) ............................................ 94 08332

(51) Int. Cl.$^7$ ................................................ C07C 7/12
(52) U.S. Cl. ...................................... 585/822; 585/824
(58) Field of Search ................................. 585/822, 824

(56) References Cited

U.S. PATENT DOCUMENTS

| | | | | |
|---|---|---|---|---|
| 2,910,139 A | * | 10/1959 | Matyear, Jr. ................. | 585/650 |
| 3,691,251 A | | 9/1972 | Bauer ......................... | 585/655 |
| 4,636,225 A | | 1/1987 | Klein et al. .................... | 95/120 |
| 4,639,259 A | | 1/1987 | Pearson ........................ | 95/132 |
| 4,795,545 A | * | 1/1989 | Schmidt ....................... | 208/91 |
| 4,917,715 A | | 4/1990 | Kaveh et al. .................. | 65/443 |
| 5,191,149 A | | 3/1993 | Kulkarni | |

FOREIGN PATENT DOCUMENTS

| | | |
|---|---|---|
| EP | 0160180 | 11/1985 |
| EP | 0360752 | 3/1990 |
| JP | 54-459 | 1/1979 |

OTHER PUBLICATIONS

Smith, D.L.,"Dehydration of Gases and Liquids with Combination Bed Adsorbents" Petroenergy 88 (Oct. 3–7, 1988).
Smith, D.L. and Veldman, R., "Adsorption of Oxygenates in Isomerization, Alkylation and MTBE Processes" Petroenergy 89 (Oct. 25–27, 1989).
Database WPI, Week 7907, Derwent Publications Ltd., London, GB; AN 79–12604B & JP–A–54 000 459 (Nichie) (Copy to Follow).

* cited by examiner

*Primary Examiner*—Glenn Caldarola
*Assistant Examiner*—Tam Nguyen
(74) *Attorney, Agent, or Firm*—Burns, Doane, Swecker & Mathis, L.L.P.

(57) ABSTRACT

The invention relates to a process for drying a gaseous or liquid mixture by passing the said mixture into an adsorber, characterized in that the water adsorption equilibrium zone of the adsorber comprises an upstream alumina zone and a downstream molecular sieve zone.

18 Claims, No Drawings

PROCESS FOR DRYING A GASEOUS OR LIQUID MIXTURE WITH THE AID OF AN ADSORBER COMPOSED OF ALUMINA AND OF A MOLECULAR SIEVE

Processes for removing water from industrial gases or from a mixture of gaseous or liquid hydrocarbons by passing the latter through adsorbents are known.

Molecular sieves are particularly employed for such processes. However, molecular sieves deteriorate rapidly because of the presence of so-called insoluble, that is to say liquid, water in the gases or liquids to be dried. In fact, this results in a loss of water removal efficiency and accelerated aging of the sieves.

To avoid this, it is known to protect molecular sieves with a layer of alumina, silica gel or active carbon, the purpose of which is to adsorb the liquid water. Combinations of alumina layers and of molecular sieves make it possible to extend the lifetime of the sieve and to ensure good drying of the gases or liquids.

However, there is still a perceptible need for an increase in the lifetime of these molecular sieves and of their adsorption effectiveness.

The aim of the invention is to propose a process for the removal of water from industrial gases or from a mixture of gaseous or liquid hydrocarbons with the aid of an adsorbent composed of the combination of layers of molecular sieves and of alumina, in order to obtain a satisfactory water removal efficiency while considerably reducing the aging of the adsorbent.

The objective of the invention is to propose a process for drying a gaseous or liquid mixture by passing the said mixture into an adsorber, characterized in that the water adsorption equilibrium zone of the adsorber comprises an upstream alumina zone and a downstream molecular sieve zone.

Other characteristics of the invention will appear on reading the description and the nonlimiting examples.

The invention relates first of all to a process for drying a gaseous or liquid mixture by passing the said mixture into an adsorber, characterized in that the water adsorption equilibrium zone of the adsorber comprises an upstream alumina zone and a downstream molecular sieve zone.

More precisely, this process deals with the removal from gaseous or liquid mixtures. The composition of this mixture may be very varied. Industrial gases or mixtures of gaseous or liquid hydrocarbons may be especially mentioned. Gases to be dried may be, for example, natural gases of methane, ethane type, etc., or associated gases obtained during the liquid/gas separation of petroleum fractions, gases originating from steam cracking or from fluid catalytic cracking (FCC), industrial gases such as pure gases: $N_2$, $O_2$Ar, etc., coke plant gases or gases originating from processes such as catalytic reforming, hydrocracking etc. The liquids to be dried may be natural-gas condensates of $CO_2$ type, liquid air or LPGs (liquid petroleum gases) such as, for example, propane or butane.

These mixtures may be unsaturated, saturated or supersaturated with water.

The process uses the principle of separation of water from gases or liquids containing it by adsorption thereof on layers of aluminas and of is molecular sieves. The process consists in introducing the gases or liquids to be dried into an adsorber where they will encounter in succession a layer of alumina and a layer of molecular sieve. The introduction of the gases or liquids can take place equally well via the top as via the bottom of the adsorber, as long as the gases or liquids pass firstly into the alumina layer and only subsequently into the molecular sieve layer.

In the use of the process the alumina adsorbs water in gaseous form, but also essentially water in liquid form, whereas the molecular sieve now adsorbs only the gaseous water.

In the process according to the invention it is essential that the alumina and the molecular sieve should be introduced in precise conditions. It is necessary, firstly, that the alumina should not be situated in the water adsorption mass transfer zone of the adsorber.

The concept of mass transfer zone, employed here, corresponds to the conventional concept of mass transfer zone in the technical field of adsorptions on beds, that is to say that it is defined as the portion of the adsorber in which the concentration of the adsorbate, in this case water, on the adsorbent varies from zero concentration to the maximum adsorption concentration at the equilibrium. This mass transfer zone is generally of constant length and moves during the adsorption cycle, right from the entry of the adsorber up to its exit (in the direction of introduction of the gases or liquids).

Very precisely, the mass transfer zone is defined in this invention as the mass transfer zone taken at the instant when the water breaks through at the exit of the adsorber, that is to say at the instant when the adsorption capacity of the adsorbent is saturated and the cycle ended.

Secondly, it is necessary that the alumina should be placed in the so-called upstream zone of the water absorption equilibrium zone of the adsorber and the molecular sieve in the so-called downstream zone of the said equilibrium zone of the adsorber.

The upstream zone, comprising alumina, corresponds to the part of the equilibrium zone which is the first one in contact with the gases or liquids to be dried, and the downstream zone, comprising the molecular sieve, corresponds to the part of the equilibrium zone which is the last one in contact with the gaseous or liquid mixture to be dried.

The equilibrium zone itself also corresponds to the conventional concept of an equilibrium zone in the technical field of adsorptions on beds. It is therefore defined as the portion of the adsorber in which the concentration of the adsorbate, in this case water, on the same single adsorbent is constant. The length of this equilibrium zone increases during the adsorption cycle.

In the context of the invention the equilibrium zone is also defined as the equilibrium zone taken at the instant when the water breaks through at the exit of the adsorber, that is to say at the instant when the adsorption capacity of the adsorbent is saturated and the cycle finished, and therefore at the same instant when the mass transfer zone is defined.

In practice, the mass transfer zone is defined from adsorption isotherms of the adsorbents employed, at a pressure and temperature which are fixed, and from the internal and external diffusion coefficients of the adsorbates in the adsorbents; the equilibrium zone is determined from the adsorption isotherms of the adsorbents employed at fixed temperature and pressure.

In the equilibrium zone of the adsorber the ratio of the volume of alumina to that of the alumina and of the molecular sieve (Q) is generally not more than 0.95.

In this case and throughout the description the volumes of alumina and of molecular sieve correspond to the volumes determined at the time of charging of the adsorber.

In the equilibrium zone of the adsorber the ratio of the volume of alumina to that of the alumina and of the molecular sieve (Q) is preferably between 0.05 and 0.95; still more preferably this ratio is between 0.05 and 0.8 and more preferably between 0.2 and 0.8, as a function of the embodiments.

In the case where the gaseous or liquid mixture is supersaturated or saturated with water and according to a first embodiment, the ratio of the volume of alumina to that of alumina and of the molecular sieve in the water adsorption equilibrium zone (Q) is preferably between 0.5 and 0.8. Such a ratio of volumes will allow the water to be removed efficiently. It is considered that a gaseous mixture is supersaturated with water when it contains, at a given temperature and pressure, water in gaseous phase and in liquid phase; and that a liquid mixture is supersaturated with water when it contains miscible water and water which is not miscible with the constituents of the liquid.

According to a second embodiment, which corresponds to the case where the gaseous or liquid mixture is undersaturated or saturated with water, the ratio of the volume of alumina to that of alumina and of molecular sieve in the water adsorption equilibrium zone (Q) is preferably between 0.05 and 0.30. A gaseous mixture is undersaturated with water at a given temperature and pressure when it contains a quantity of gaseous water which is lower than that corresponding to saturation, the said saturation corresponding to the maximum solubility of water in the gaseous mixture at a given temperature and pressure. A liquid mixture is undersaturated with water at a given temperature when it contains a quantity of miscible water which is lower than that at saturation, the saturation corresponding to the maximum solubility of water in the liquid mixture at a given temperature.

The aluminas employed in the process according to the invention are generally the product of rapid dehydration of at least one aluminium hydroxide such as bayerite, hydrargillite or gibbsite, nordstrandite and/or of at least one aluminium oxyhydroxide such as boehmite, pseudoboehmite and diaspore. They may be the product in particular of the process described in Patent FR 1 108 011. It is also possible to employ alumina gels.

The special aluminas Spheralite® 501 A and C, 505 A and CR, marketed by Procatalyse are suitable for this type of process.

All types of molecular sieves which are suitable for drying gaseous or liquid mixtures can be employed. These sieves may in particular include zeolites. Zeolites chosen from the group including zeolites A and X will be used preferably. Still more preferably, molecular sieves will be employed which are composed of zeolite formed with the aid of a binder which may be a clay (kaolinite, bentonite, montmorillonite, attapulgite etc.), an alumina (alumina gel or alumina produced by the rapid dehydration of aluminium hydroxides or oxyhydroxides), an amorphous mixture of silica and alumina, a silica gel or titanium oxide.

The nature of the layer of molecular sieve and the size of the molecular sieves in the mass transfer zone and in the equilibrium zone may be different. For example, if the sieve is in the form of extrudates, their diameters may vary, depending on whether they are in the mass transfer zone or in the water adsorption equilibrium zone.

The process requires the use of at least one adsorber which is filled in the proportions and with the products defined above. The unit making use of the process may consist of a number of adsorbers operating in series or in parallel, some operating in an adsorption mode while the others operate in a regeneration mode.

The invention also relates to a process for drying a liquid or gaseous mixture as defined above, in which the mixture additionally includes HCl, and characterized in that the water adsorption zone of the adsorber is preceded, in the direction of flow of the mixture in the adsorber, by an alumina-based zone making it possible to remove the HCl present in the mixture.

The drying process according to the invention may therefore be combined more generally with processes for removal of compounds other than water, such as, for example, HCl. In this case the gaseous or liquid mixture from which it is desired to remove water and HCl is introduced into an adsorber including an alumina-based first adsorption zone for HCl and a second adsorption zone for water, which makes use of the process according to the invention, that is to say a water adsorption zone in which the equilibrium zone comprises an upstream alumina zone and a downstream molecular sieve zone.

The first adsorption zone for HCl generally consists of an alumina of the same type as those mentioned above and preferably doped with an alkaline-earth material.

The invention also relates to a process for drying a liquid or gaseous mixture as defined above, in which the mixture additionally includes $H_2S$, and characterized in that the water adsorption zone of the adsorber is followed, in the direction of flow of the mixture in the adsorber, by a molecular sieve-based zone making it possible to remove the $H_2S$ present in the mixture.

In this case the gaseous or liquid mixture from which it is desired to remove water and $H_2S$ is introduced into an adsorber including a first adsorption zone for water, which makes use of the process according to the invention, that is to say a water adsorption zone in which the equilibrium zone comprises an upstream alumina zone and a downstream molecular sieve zone, and a molecular sieve-based second adsorption zone for $H_2S$.

The second adsorption zone for $H_2S$ is generally based on molecular sieves of the type of those mentioned above, involving preferably type 5A molecular sieves.

Finally, the invention relates to a process for drying a liquid or gaseous mixture as defined above, in which the mixture additionally includes HCl and $H_2S$, and characterized in that the water adsorption zone of the adsorber is preceded, in the direction of flow of the mixture within the adsorber, by an alumina-based zone making it possible to remove the HCl present in the mixture, and followed by a molecular sieve-based zone making it possible to remove the $H_2S$ present in the mixture.

Some first principles of the running conditions of the adsorbers are given below by way of examples, it being understood that a person skilled in the art will, if necessary, adapt these conditions as a function of the type of gaseous or liquid mixture being treated.

The surface velocity of the gaseous mixture in the adsorber is between 1 and 20 m/min and that of the liquid mixture between 0.1 and 2 m/min.

The pressure within the adsorber is between 600 mm Hg and 150 bars.

The temperature within the adsorber is between −40 and 100° C.

When the adsorption is finished the adsorber is regenerated by introduction of a fluid while the temperature is raised and/or by reduction in the partial pressure. The temperature may be between 0 and 350° C. and the regeneration pressure (PG) between 1 and 120 bars. In the case of reduction in the partial pressure, the pressure reduction is at most 4 bars/min.

The following examples illustrate the invention without, however, limiting its scope.

EXAMPLES 1 to 14

In all the examples 1 to 14 the gas being treated is natural gas whose composition by volume is the following:

| | |
|---|---|
| Nitrogen | 1.3% |
| CO$_2$ | 3.0% |
| Methane | 75.3% |
| Ethane | 11.6% |
| Propane | 4.6% |
| Isobutane | 1.2% |
| n-Butane | 1.4% |
| Isopentane | 0.4% |
| n-Pentane | 0.4% |
| n-Hexane | 0.1% |
| n-Heptane | 0.1% |
| H$_2$S | 10 ppm by volume, | its water content varying from 1000 ppm to 1450 ppm by volume.

In all the examples the operating conditions of adsorption are the following:

| | |
|---|---|
| Pressure | 46.0 bars |
| Temperature | 30° C. |
| Adsorption time | 24 hours |
| Flow rate per drier | 30 Sm$^3$/h |
| Flow direction | upward | and the operating conditions for regeneration are the following:

| | |
|---|---|
| Gas type | dry natural gas |
| Regeneration pressure | 40 or 15 bars |
| Flow direction | downward |
| Temperature | 260° C. |
| Heating time | 4 h |
| Cooling time | 4 h |
| Gas flow rate | 4 Sm$^3$/h |

The unit consists of three adsorbers operating in parallel, two of which adsorb when the third desorbs.

With the fluid travelling upwards, the equilibrium zone, made up in its lower layer or upstream zone of an alumina layer and in its upper layer or downstream zone of a molecular sieve layer, is found in the bottom of the column, and the water adsorption mass transfer zone, made up only of the molecular sieve, is found above the water adsorption equilibrium zone.

The adsorbers are columns of 70 mm internal diameter. The alumina employed in the equilibrium zone is Spheralite® 501A alumina marketed by Procatalyse; this is an activated alumina which is in the form of beads from 2 to 5 mm in diameter. The molecular sieve employed in the equilibrium zone is a zeolite in the form of extrudates of 3.2-mm diameter, and that in the mass transfer zone a zeolite in the form of extrudates of 1.6-mm diameter. In both cases this is molecular sieve 4 ANG marketed by Procatalyse.

EXAMPLES 1 to 4

The natural gas to be treated is undersaturated with water and contains 1000 ppm of water by volume.

The aging factors (F) of two units operating according to the process of the invention, one with a ratio of the volume of alumina to the volume of alumina and of the molecular sieve, in the water adsorption equilibrium zone, Q, of 0.107, the other of 0.152, are set in parallel with the aging factors of a unit consisting solely, in its water adsorption equilibrium zone, of molecular sieve (Q=0) and of a unit consisting solely, in its water adsorption equilibrium zone, of alumina (Q=1).

The aging factor is the ratio of the real water adsorption capacity of the adsorbent system at the end of x regenerations, to the real water adsorption capacity of the new adsorbent system, that is to say at the end of one regeneration.

More precisely, the adsorbers according to the invention have the following composition:

TABLE 1

| | Example 1 Mass and volume in the unit Q = 0.107 | Example 2 Mass and volume in the unit Q = 0.152 | Comparative Example 3 Mass and volume in the unit Q = 1 | Comparative Example 4 Mass and volume in the unit Q = 0 |
|---|---|---|---|---|
| Water adsorption equilibrium zone | | | | |
| activated alumina | 0.6 l 474 g | 0.85 l 685 g | 5.6 l 4450 g | 0 l 0 g |
| molecular sieve | 5.0 l 3500 g | 4.75 l 3300 g | 0 l 0 g | 5.6 l 3870 g |
| Water adsorption mass transfer zone | | | | |
| molecular sieve | 1 l 700 g | 1 l 700 g | 1 l 700 g | 1 l 700 g |

The aging factors (F) of the units of ratio Q=0.107 and 0.152, operating at a regeneration pressure (PG) of 40 bars are measured as a function of the number of regenerations of the adsorbers, and are compared with the aging factors (F) of the units of ratio Q=0 and 1 operating at a regeneration pressure (PG) of 40 bars.

Identical factors have been measured for the units of ratio Q=0.107 and 0.152. The following results are obtained:

TABLE 2

| Number of regenerations per adsorber | Examples 1 and 2 F for the units Q = 0.107 and 0.152 PG = 40 bars | Comparative Example 3 F for the unit Q = 1 PG = 40 bars | Comparative Example 4 F for the unit Q = 0 PG = 40 bars |
|---|---|---|---|
| 1 | 1 | 1 | 1 |
| 10 | 0.96 | 0.92 | 0.88 |
| 100 | 0.90 | 0.88 | 0.78 |
| 200 | 0.88 | 0.80 | 0.69 |
| 500 | 0.85 | 0.75 | 0.60 |
| 700 | 0.84 | 0.60 | 0.52 |
| 1000 | 0.80 | 0.50 | 0.48 |

The water concentrations of the gases leaving the adsorbers of Q=0.107 and 0.152 and of those from the adsorbers of Q=0 and 1 are equivalent and lower than 0.1 ppm by volume.

EXAMPLES 5 to 7

The natural gas to be treated contains 1150 ppm of water by volume.

The aging factors of two units operating according to the process of the invention, one with a ratio of the volume of alumina to the volume of alumina and of the molecular sieve in the water adsorption equilibrium zone, Q, of 0.141, the other of 0.25, are set in parallel with the aging factors of a unit consisting, in its water adsorption equilibrium zone, solely of molecular sieve and therefore of ratio Q=0.

More precisely, the adsorbers according to the invention have the following composition:

TABLE 3

|  | Example 5 Mass and volume in the unit $Q = 0.141$ | Example 6 Mass and volume in the unit $Q = 0.25$ | Comparative Example 7 Mass and volume in the unit $Q = 0$ |
|---|---|---|---|
| Water adsorption equilibrium zone ||||
| activated alumina | 0.9 l<br>714 g | 1.6 l<br>1270 g | 0 l<br>0 g |
| molecular sieve | 5.5 l<br>3800 g | 4.8 l<br>3325 g | 6.4 l<br>4450 g |
| Water adsorption mass transfer zone ||||
| molecular sieve | 1 l<br>700 g | 1 l<br>700 g | 1 l<br>700 g |

The aging factors (F) of the units of ratio Q=0.142 and 0.25 operating at a regeneration pressure (PG) of 40 bars are measured as a function of the number of regenerations of the adsorbers and are compared with the aging factors (F) of the unit of ratio Q=0 operating at a regeneration pressure (PG) of 40 bars or of 15 bars.

Identical factors have been measured for the units of ratio Q=0.142 and 0.25.

The following results are obtained:

TABLE 4

| Number of regenerations per adsorber | Examples 5 and 6 F of the units $Q = 0.141$ and 0.25 PG = 40 bars | Comparative Example 7 F of the unit $Q = 0$ PG = 40 bars | Comparative Example 7 F of the unit $Q = 0$ PG = 15 bars |
|---|---|---|---|
| 1 | 1 | 1 | 1 |
| 10 | 0.96 | 0.91 | 0.93 |
| 100 | 0.90 | 0.86 | 0.88 |
| 200 | 0.88 | 0.78 | 0.82 |
| 500 | 0.85 | 0.70 | 0.75 |
| 700 | 0.84 | 0.55 | 0.65 |
| 1000 | 0.80 | 0.40 | 0.45 |

It is found that the aging of the adsorbers of ratio Q=0.142 and 0.25 is less accentuated than that of the adsorber of ratio Q=0, even if the latter is regenerated under a PG of 15 bars, which limits the aging of the adsorber when compared with an operation at PG=40 bars.

The water concentrations of the gases leaving the adsorbers of Q=0.141 and 0.25 and of those from the adsorber of Q=0 are equivalent and lower than 0.1 ppm by volume.

EXAMPLES 8 to 10

The natural gas to be treated contains 1260 ppm of water by volume. -

The aging factors of two units operating according to the process of the invention, one with a ratio of the volume of alumina to the volume of alumina and of the molecular sieve in the water adsorption equilibrium zone (Q) of 0.292, the other of 0.5, are set in parallel with the aging factors of a unit consisting, in its water adsorption equilibrium zone, solely of molecular sieve, therefore of ratio Q=0.

More precisely, the adsorbers according to the invention have the following composition:

TABLE 5

|  | Example 8 Mass and volume in the unit $Q = 0.292$ | Example 9 Mass and volume in the unit $Q = 0.5$ | Comparative Example 10 Mass and volume in the unit $Q = 0$ |
|---|---|---|---|
| Equilibrium zone ||||
| activated alumina | 2.1 l<br>1660 g | 3.6 l<br>2850 g | 0 l<br>0 g |
| molecular sieve | 5.1 l<br>3519 g | 3.6 l<br>2480 g | 7.2 l<br>4950 g |
| Mass transfer zone ||||
| molecular sieve | 1 l<br>700 g | 1 l<br>700 g | 1 l<br>700 g |

The aging factors (F) of the units of ratio Q=0.296 and 0.5 operating at a regeneration pressure (PG) of 40 bars are measured as a function of the number of regenerations of the adsorbers and are compared with the aging factors (F) of the unit of ratio Q=0 operating at a regeneration pressure (PG) of 40 bars or of 15 bars.

Identical factors have been measured for the units of ratio Q=0.292 and 0.5.

The following results are obtained:

TABLE 6

| Number of regenerations per adsorber | Examples 8 and 9 F of the units $Q = 0.292$ and 0.5 PG = 40 bars | Comparative Example 10 F of the unit $Q = 0$ PG = 40 bars | Comparative Example 10 F of the unit $Q = 0$ PG = 15 bars |
|---|---|---|---|
| 1 | 1 | 1 | 1 |
| 10 | 0.97 | 0.88 | 0.90 |
| 100 | 0.92 | 0.72 | 0.76 |
| 200 | 0.88 | 0.52 | 0.56 |
| 500 | 0.85 | 0.42 | 0.45 |
| 700 | 0.84 | 0.35 | 0.39 |
| 1000 | 0.80 | 0.15 | 0.20 |

It is found that the aging of the adsorbers of ratio Q=0.296 and 0.5 is less accentuated than that of the adsorber of ratio Q=0, even if the latter is generated at a PG of 15 bars, which limits the aging of the adsorber when compared with an operation at PG=40 bars.

The water concentrations of the gases leaving the adsorbers of Q=0.296 and 0.5 and of those of the adsorber of Q=0 are equivalent and lower than 0.1 ppm by volume.

EXAMPLES 11 to 14

The natural gas to be treated is supersaturated and contains 1450 ppm of water by volume.

The aging factors of two units operating according to the process of the invention, one with a ratio of the volume of alumina to the volume of alumina and of the molecular sieve in the equilibrium zone of 0.5, the other of 0.8, are set in parallel with the aging factors of a unit consisting, in its water adsorption equilibrium zone, solely of molecular sieve and therefore of ratio Q=0 and of a unit consisting, in its water adsorption equilibrium zone, solely of alumina and therefore of ratio Q=1.

More precisely, the adsorbers according to the invention have the following composition:

TABLE 7

|  | Example 11 Mass and volume in the unit Q = 0.5 | Example 12 Mass and volume in the unit Q = 0.8 | Comparative Example 13 Mass and volume in the unit Q = 0 | Comparative Example 14 Mass and volume in the unit Q = 1 |
|---|---|---|---|---|
| | Water adsorption equilibrium zone | | | |
| activated alumina | 4.18 l 3300 g | 6.68 l 5280 g | 0 l 0 g | 8.36 l 6600 g |
| molecular sieve | 4.18 l 2880 g | 1.68 l 1180 g | 8.36 l 5770 g | 0 l 0 g |
| | Water adsorption mass transfer zone | | | |
| molecular sieve | 1 l 700 g | 1 l 700 g | 1 l 700 g | 1 l 700 g |

The aging factors (F) of the units of ratio Q=0.5 and 0.8 operating at a regeneration pressure (PG) of 40 bars are measured as a function of the number of regenerations of the adsorbers and are compared with the aging factors (F) of the unit of ratio Q=1 operating at a regeneration pressure (PG) of 40 bars and to the aging factors (F) of the unit of ratio Q=0 operating at a regeneration pressure (PG) of 40 bars or 15 bars.

Identical factors are measured for the units of ratio Q=0.5 and 0.8.

The following results are obtained:

TABLE 8

| Number of regenerations per adsorber | Examples 11 and 12 F of the units Q = 0.5 and 0.8 PG = 40 bars | Comparative Example 13 F of the unit Q = 0 PG = 40 bars | Comparative Example 14 F of the unit Q = 1 PG = 40 bars | Comparative Example 13 F of the unit Q = 0 PG = 15 bars |
|---|---|---|---|---|
| 1 | 1 | 1 | 1 | 1 |
| 10 | 0.96 | 0.70 | 0.90 | 0.75 |
| 100 | 0.90 | 0.40 | 0.80 | 0.50 |
| 200 | 0.88 | 0.30 | 0.70 | 0.25 |
| 500 | 0.85 | 0.10 | 0.65 | 0.15 |
| 700 | 0.84 | 0 | 0.57 | 0.05 |
| 1000 | 0.80 | 0 | 0.50 | 0 |

The water concentrations of the gases leaving the adsorbers of Q=0.5 and 0.8 and of those of the adsorbers of Q=0 and 1 are equivalent and lower than 0.1 ppm by volume.

EXAMPLES 15 to 17

The gas treated is a hydrogen-rich gas whose composition in moles is the following:

| $H_2$ | 80 |
|---|---|
| Methane | 10 |
| Ethane | 6 |
| Hydrocarbons in which the number of C is higher than 3 | 4 |

This gas also contains water, HCl and $H_2S$ in the following proportions:

| Water | 1000 ppm by volume |
|---|---|
| HCl | 20 ppm by volume |
| $H_2S$ | 10 ppm by volume |

In this example the operating conditions of adsorption are the following:

| Pressure | 10 bars |
|---|---|
| Temperature | 25° C. |
| Adsorption time | 12 h |
| Flow rate | 50 $Sm^3/h$ |
| Flow direction | upward | and the operating conditions of regeneration are the following:

| Gas type | hydrogen-rich dry gas |
|---|---|
| Regeneration pressure | 9.5 bars |
| Flow direction | downward |
| Temperature | 260° C. |
| Heating time | 6 h |
| Cooling time | 5.5 h |
| Gas flow rate | 5 $Sm^3/h$ |

The unit consists of two adsorbers operating in parallel, one of which adsorbs while the other desorbs.

The adsorbers are columns of 1400 mm internal diameter.

The aging factor of a unit operating according to the process of the invention with a ratio of the volume of alumina to the volume of alumina and of the molecular sieve in the water adsorption equilibrium zone of 0.2 is set in parallel with the aging factors of units consisting solely of molecular sieve and therefore of ratio Q=0 or solely of alumina and therefore of ratio Q=1.

More precisely, the units have the following compositions:

TABLE 9

|  | Example 15 Q = 0.2 Mass and type of adsorbent | Comparative Example 16 Q = 0 Mass and type of adsorbent | Comparative Example 17 Q = 1 Mass and type of adsorbent |
|---|---|---|---|
| | HCl adsorption zone | | |
| activated alumina | 5000 g SAS 357 type | 0 g | 5000 g SAS357 type |
| molecular sieve | 0 g | 5000 g 4 ANG type | 0 g |
| | Water adsorption equilibrium zone | | |
| activated alumina | 500 g SAS 357 type | 0 g | 2500 g SAS 357 type |
| molecular sieve | 2000 g 4 ANG type | 2500 g 4 ANG type | 0 g |
| | Water mass transfer zone | | |
| activated alumina | 0 g | 0 g | 500 g SAS 357 type |
| molecular sieve | 500 g 4 ANG type | 500 g 4 ANG type | 0 g |

TABLE 9-continued

| | Example 15<br>Q = 0.2<br>Mass and type<br>of adsorbent | Comparative<br>Example 16<br>Q = 0<br>Mass and type<br>of adsorbent | Comparative<br>Example 17<br>Q = 1<br>Mass and type<br>of adsorbent |
|---|---|---|---|
| | $H_2S$ Adsorption zone | | |
| activated<br>alumina | 0 g | 0 g | 1900 g<br>SAS 357 type |
| molecular<br>sieve | 1900 g<br>5 As type | 1900 g<br>4 ANG type | 0 g |

The SAS 357 alumina marketed by Procatalyse is made up of sodium-doped alumina beads with a diameter of between 2 and 5 mm.

The 4ANG molecular sieve marketed by Procatalyse is a zeolite 4A which is in the form of extrudates of 1.6 mm diameter.

The 5AS molecular sieve marketed by Procatalyse is a zeolite 5A which is in the form of extrudates of 1.6 mm diameter.

The aging factors (F) of the units are measured as a function of the number of regenerations of the adsorbers.

TABLE 10

| Number of<br>regenerations<br>per adsorber | Aging factor<br>unit<br>Q = 0.2 | Aging factor<br>unit<br>Q = 0 | Aging factor<br>unit<br>Q = 1 |
|---|---|---|---|
| 1 | 1 | 1 | 1 |
| 10 | 0.97 | 0.90 | 0.93 |
| 100 | 0.91 | 0.70 | 0.85 |
| 200 | 0.88 | 0.60 | 0.7 |
| 500 | 0.8 | 0.40 | 0.6 |
| 700 | 0.75 | 0.20 | 0.5 |
| 1000 | 0.67 | 0 | 0.3 |

On leaving the adsorber whose Q is 0.2, the water content of the gas is 0.2 ppm by volume, that of HCl 0.1 ppm by volume and that of $H_2S$ 0.1 ppm by volume.

What is claimed is:

1. A process for drying a gaseous or liquid mixture by passing said mixture into an adsorber, the adsorber including a water adsorption equilibrium zone and a water adsorption mass transfer zone, the equilibrium zone comprising an upstream alumina zone and a downstream molecular sieve zone, the mass transfer zone comprising a downstream portion of the molecular sieve zone, water concentration in the mass transfer zone varying from zero to the maximum water concentration at the equilibrium zone, the liquid or gaseous mixture additionally including HCl, the water adsorption zone of the adsorber being preceded, in the direction of flow of the mixture in the adsorber, by an alumina-based zone which removes HCl present in the mixture.

2. A process for drying a gaseous or liquid mixture by passing said mixture into an adsorber, the adsorber including a water adsorption equilibrium zone and a water adsorption mass transfer zone, the equilibrium zone comprising an upstream alumina zone and a downstream molecular sieve zone, the mass transfer zone comprising a downstream portion of the molecular sieve zone, water concentration in the mass transfer zone varying from zero to the maximum water concentration at the equilibrium zone, the liquid or gaseous mixture additionally including $H_2S$, the water adsorption zone of the adsorber being followed, in the direction of flow of the mixture in the adsorber, by molecular sieve-based zone which removes $H_2S$ present in the mixture.

3. A process for drying a gaseous or liquid mixture by passing said mixture into an adsorber, the adsorber including a water adsorption equilibrium zone and a water adsorption mass transfer zone, the equilibrium zone comprising an upstream alumina zone and a downstream molecular sieve zone, the mass transfer zone comprising a downstream portion of the molecular sieve zone, water concentration in the mass transfer zone varying from zero to the maximum water concentration at the equilibrium zone, the liquid or gaseous mixture additionally including $H_2S$ and HCl, the water adsorption zone of the adsorber being preceded, in the direction of flow of the mixture in the adsorber, by an alumina-based zone which removes HCl present in the mixture, and the water adsorption zone being followed by a molecular sieve-based zone which removes $H_2S$ present in the mixture.

4. A process for drying a gaseous or liquid mixture by passing said mixture into an adsorber, the adsorber including a water adsorption equilibrium zone and a water adsorption mass transfer zone, the equilibrium zone comprising an upstream alumina zone and a downstream molecular sieve zone, the mass transfer zone comprising a downstream portion of the molecular sieve zone, water concentration in the mass transfer zone varying from zero to the maximum water concentration at the equilibrium zone, wherein in the water adsorption equilibrium zone of the adsorber, the ratio Q of the volume of alumina to that of alumina and of the molecular sieve is between 0.05 and 0.8 at an instant when water breaks through at an exit of the adsorber, wherein the liquid or gaseous mixture additionally includes $H_2S$ and HCl, the water adsorption zone of the adsorber being preceded, in the direction of flow of the mixture in the adsorber, by an alumina-based zone which removes HCl present in the mixture, and the water adsorption zone being followed by a molecular-sieve-based zone which removes $H_2S$ present in the mixture.

5. Process according to claim 1, wherein in the water adsorption equilibrium zone of the adsorber, the ratio Q of the volume of alumina to that of alumina and of the molecular sieve is between 0.05 and 0.95 at an instant when water breaks through at an exit of the adsorber.

6. Process according to claim 5, wherein in the water adsorption equilibrium zone of the adsorber, the ratio Q of the volume of alumina to that of alumina and of the molecular sieve is between 0.05 and 0.8 at an instant when water breaks through at an exit of the adsorber.

7. Process according to claim 6, wherein in the water adsorption equilibrium zone of the adsorber, the ratio Q of the volume of alumina to that of alumina and of the molecular sieve is between 0.2 and 0.8 at an instant when water breaks through at an exit of the adsorber.

8. Process according to claim 1, wherein in the water adsorption equilibrium zone of the adsorber, the ratio Q of the volume of alumina to that of alumina and of the molecular sieve is between 0.05 and 0.30 at an instant when water breaks through at an exit of the adsorber.

9. Process according to claim 2, wherein in the water adsorption equilibrium zone of the adsorber, the ratio Q of the volume of alumina to that of alumina and of the molecular sieve is between 0.05 and 0.95 at an instant when water breaks through at an exit of the adsorber.

10. Process according to claim 9, wherein in the water adsorption equilibrium zone of the adsorber, the ratio Q of the volume of alumina to that of alumina and of the molecular sieve is between 0.05 and 0.8 at an instant when water breaks through at an exit of the adsorber.

11. Process according to claim 10, wherein in the water adsorption equilibrium zone of the adsorber, the ratio Q of the volume of alumina to that of alumina and of the molecular sieve is between 0.2 and 0.8 at an instant when water breaks through at an exit of the adsorber.

12. Process according to claim 2, wherein in the water adsorption equilibrium zone of the adsorber, the ratio Q of the volume of alumina to that of alumina and of the molecular sieve is between 0.05 and 0.30 at an instant when water breaks through at an exit of the adsorber.

13. Process according to claim 3, wherein in the water adsorption equilibrium zone of the adsorber, the ratio Q of the volume of alumina to that of alumina and of the molecular sieve is between 0.05 and 0.95 at an instant when water breaks through at an exit of the adsorber.

14. Process according to claim 13, wherein in the water adsorption equilibrium zone of the adsorber, the ratio Q of the volume of alumina to that of alumina and of the molecular sieve is between 0.05 and 0.8 at an instant when water breaks through at an exit of the adsorber.

15. Process according to claim 14, wherein in the water adsorption equilibrium zone of the adsorber, the ratio Q of the volume of alumina to that of alumina and of the molecular sieve is between 0.2 and 0.8 at an instant when water breaks through at an exit of the adsorber.

16. Process according to claim 3, wherein in the water adsorption equilibrium zone of the adsorber, the ratio Q of the volume of alumina to that of alumina and of the molecular sieve is between 0.05 and 0.30 at an instant when water breaks through at an exit of the adsorber.

17. Process according to claim 4, wherein in the water adsorption equilibrium zone of the adsorber, the ratio Q of the volume of alumina to that of alumina and of the molecular sieve is between 0.2 and 0.8 at an instant when water breaks through at an exit of the adsorber.

18. Process according to claim 4, wherein in the water adsorption equilibrium zone of the adsorber, the ratio Q of the volume of alumina to that of alumina and of the molecular sieve is between 0.05 and 0.30 at an instant when water breaks through at an exit of the adsorber.

* * * * *

UNITED STATES PATENT AND TRADEMARK OFFICE
CERTIFICATE OF CORRECTION

PATENT NO. : 6,797,854 B1 Page 1 of 1
APPLICATION NO. : 08/499442
DATED : September 28, 2004
INVENTOR(S) : Gerard Jochem It is certified that error appears in the above-identified patent and that said Letters Patent is hereby corrected as shown below:

On the title page Item (73) Assignee: Change "Rhone-Poulenc Chimie, Courbevoie Cedex (FR)" to -- Institut Francais du Pétrole, Rueil-Malmaison Cedex (FR) --

Signed and Sealed this

Seventh Day of October, 2008

JON W. DUDAS
*Director of the United States Patent and Trademark Office*